(12) United States Patent
McEvoy (10) Patent No.: US 9,821,873 B1
(45) Date of Patent: Nov. 21, 2017

(54) RECUMBENT CYCLE

(71) Applicant: BikeRV, LLC, Virginia Beach, VA (US)

(72) Inventor: Timothy Joseph McEvoy, Virginia Beach, VA (US)

(73) Assignee: BikeRV. LLC, Virginia Beach, VA (US)

(*) Notice: Subject to any disclaimer, the term of this patent is extended or adjusted under 35 U.S.C. 154(b) by 0 days.

(21) Appl. No.: 15/296,758

(22) Filed: Oct. 18, 2016

(51) Int. Cl.
| | |
|---|---|
| *B62J 17/08* | (2006.01) |
| *A47C 17/16* | (2006.01) |
| *C25D 9/00* | (2006.01) |
| *B62K 3/00* | (2006.01) |
| *B62J 1/00* | (2006.01) |
| *B62K 5/02* | (2013.01) |

(52) U.S. Cl.
CPC .............. *B62K 3/005* (2013.01); *B62J 1/007* (2013.01); *B62J 17/08* (2013.01); *B62K 5/02* (2013.01)

(58) Field of Classification Search
CPC .......... B62J 17/08; A47C 17/161; C25D 9/00
See application file for complete search history.

(56) References Cited

U.S. PATENT DOCUMENTS

| | | | | |
|---|---|---|---|---|
| 4,313,517 A | * | 2/1982 | Pivar ..................... | B60J 5/0487 |
| | | | | 180/206.5 |
| 4,543,675 A | * | 10/1985 | Shrock ................. | A47C 17/161 |
| | | | | 5/18.1 |
| 2010/0200033 A1 | * | 8/2010 | Forester .................. | B62J 17/08 |
| | | | | 135/88.04 |

* cited by examiner

*Primary Examiner* — Bryan Evans
(74) *Attorney, Agent, or Firm* — TraskBritt

(57) ABSTRACT

A recumbent cycle includes a seat for a rider that is operable between a cycling condition and a reclined condition in which the seat forms a bed. The cycle may also include a collapsible shelter that, when erected, encloses the tricycle.

20 Claims, 9 Drawing Sheets

RECUMBENT CYCLE

TECHNICAL FIELD

This invention relates to a recumbent cycle, more particularly, but not exclusively to a recumbent cycle suitable for extended travels.

BACKGROUND

Recumbent cycles have a seat that places the rider in a recumbent or laid-back position and provides support to the back as well as the buttocks. They have several advantages over conventional cycles including better ergonomics due the better support offered by the seat, and better aerodynamics due to a smaller frontal profile presented by the rider. Seat angles as measured from horizontal across the lumbar curve area with a straight edge are usually between 65 and 20 degrees with 40 to 30 degrees being popular.

There exist many different cycle configurations. At a generic level, recumbent cycles typically have either two wheels (bicycle) or three wheels (tricycle/trike) though some are produced with four wheels. Much variation exists as to wheel base, wheel dimensions and the like.

Recumbent cycles enjoy some popularity in long distance cycling due to their ergonomics and aerodynamics, which tend to make cycling more comfortable and efficient. During extended travels taking place over a number of days it is usually required to carry on the cycle at least a shelter and camping cot, stretcher or similar. This adds to the weight to be transported and reduces the space available for provisions, clothing and other goods.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

BRIEF SUMMARY

In accordance with this invention there is provided a recumbent cycle having a seat for a rider which is operable between a cycling condition and a reclined condition in which it forms a bed.

Further features of the invention provide for the cycle to be a tricycle; and for the tricycle to be configured with two front wheels and a single rear wheel.

Still further features of the invention provide for the recumbent cycle to include a collapsible shelter that may be erected over at least the seat; for the shelter to at least partially enclose the cycle; for the shelter to include struts releasably securable to the cycle and a canopy securable over the struts; for the canopy to be made of flexible sheet material; for the canopy to include openings with a number of different covers which are securable in or over each opening.

According to one aspect of the invention there is provided for the seat to have a seat back and a seat bottom and in which the seat back is inclined relative to the seat bottom in the cycling condition and the seat back and the seat bottom extend in generally the same plane in the reclined condition.

The invention also provides a recumbent cycle having a frame with a seat for a rider thereon and wherein a collapsible shelter is provided, which may be erected over at least the seat.

Further features of the invention provide for the shelter to at least partially enclose the cycle; for the shelter to include struts that are releasably securable to the cycle and a canopy securable over the struts; for the canopy to be made of flexible sheet material; for the canopy to include openings with a number of different covers which are securable in or over each opening.

According to one aspect of the invention the recumbent cycle is configured to selectively support a stretcher in a substantially horizontal orientation.

According to a further aspect of the invention the seat is operable between a cycling condition and a reclined condition in which it forms a bed or a sleeping compartment.

An embodiment of the invention will now be described, by way of example only, with reference to the accompanying drawings.

DETAILED DESCRIPTION

A recumbent cycle is provided, which is preferably a tricycle (or trike) but may also be a bicycle or a quadracycle.

The wheel configuration of the tricycle may be two wheels in the front (the tadpole configuration) or two wheels at the rear (the delta configuration). While a foot powered cycle is described, the cycle could also be hand or electrically powered.

The recumbent cycle has a seat for a rider, which may be operable between a cycling condition and a reclined condition in which it forms a bed. The cycling condition is the condition of the seat that permits the rider or cyclist to pedal the cycle from the recumbent position. It thus permits the cyclist to operate the pedals while supporting or bracing the cyclists back and preventing rearward movement of the cyclist as a result of force applied to the pedals. Typically the cycling condition has the buttocks of the cyclist supported and the legs inclined relative to the back of the cyclist in a chair-like position.

In the reclined condition the seat forms a bed in which the cyclist may lie in a supine position with the back and legs aligned. The seat may extend horizontally or have a seat angle close to zero degrees. In this condition, the cyclist will typically not be able to operate the cycle and will be supported above the pedals.

The seat may have a seat back and a seat bottom with the seat back inclined relative to the seat bottom in the cycling condition and the seat back and the seat bottom operable to extend in generally the same plane, or co-planar, in the reclined condition. The seat back and seat bottom may extend in a generally horizontal plane in the reclined position. That is to say, the seat back and seat bottom may extend generally parallel with a surface on which the wheels rest in normal operation of the recumbent cycle so as to form a bed on which the cyclist may rest.

A head extension may be provided on the seat and is inclined away from the seat back in the cycling position and is generally co-planar with the seat back and seat bottom in the reclined condition.

The seat bottom, seat back and head extension may have a stretcher-like construction with a suitable fabric or material covering a frame. Alternatively the seat bottom, seat back and head extension may be padded and generally flat or have slightly inwardly curved sides for comfort and to assist in containing a cyclist in the seat in both the cycling and reclined conditions.

The recumbent cycle may alternatively be configured to accommodate a stretcher, preferably above the seat. Such a stretcher may be collapsible and stowable on the recumbent cycle when not in use. Fittings may be provided which secure the stretcher in position on the recumbent cycle when in use.

The recumbent cycle may include a collapsible shelter, which may be erected over the seat. The shelter may at least partially enclose, preferably substantially enclose, the cycle and may co-operate with a body extending from the cycle and may form a lower half of the enclosure. The body may have a shell-like form and be fixed to the frame of the cycle. The body may be molded from a plastic or a composite material. It is also foreseen that the body of the cycle may have a monocoque structure.

The shelter may include struts that can be releasably secured to the cycle, such as to the body or frame of the cycle, and a canopy made of flexible sheet material that is securable over the struts. Any suitable sheet material can be used, in particular, for example, material used in the construction of tents, including nylons, polyesters, polycottons, cotton and the like. The struts may be flexible and secured at either end in sockets in the body or frame. The sockets may be positioned to hold the struts in a flexed or bent condition.

The canopy may include openings. Such openings may be positioned to provide windows or entrances or access openings and may each be provided with a number of different complementary covers. Such covers may be securable in or over each opening and include a mesh, a transparent panel and an opaque panel. Zip fasteners may conveniently be used to secure each cover over an opening.

A transparent panel may be provided in the canopy to provide a windshield for the cyclist. Alternately, where a fixed windshield is provided on the cycle, for example extending from the body, the canopy may simply fit around it.

Fasteners may be provided on the canopy to secure it to the struts. Such fasteners may include loops through which the struts can extend, drawstrings and straps. The loops may be fixed or may be configured to fasten about the struts, such as through the use of hook and pile tape, such as VEL-CRO®, press studs, ties and the like.

Hooks may be provided on the canopy to fasten it to the body when erected. Also, guy-ropes may be provided on the canopy to allow the cycle to be securely tied down in severe weather.

The canopy may be stored in a folded or crumpled condition when collapsed and a receptacle may be provided on the cycle in which to store it.

Where the recumbent cycle is a bicycle it may be provided with a stand, which may be deployed to maintain the cycle in an upright condition when not being operated and particularly when the seat is in the reclined condition.

Figure 6:
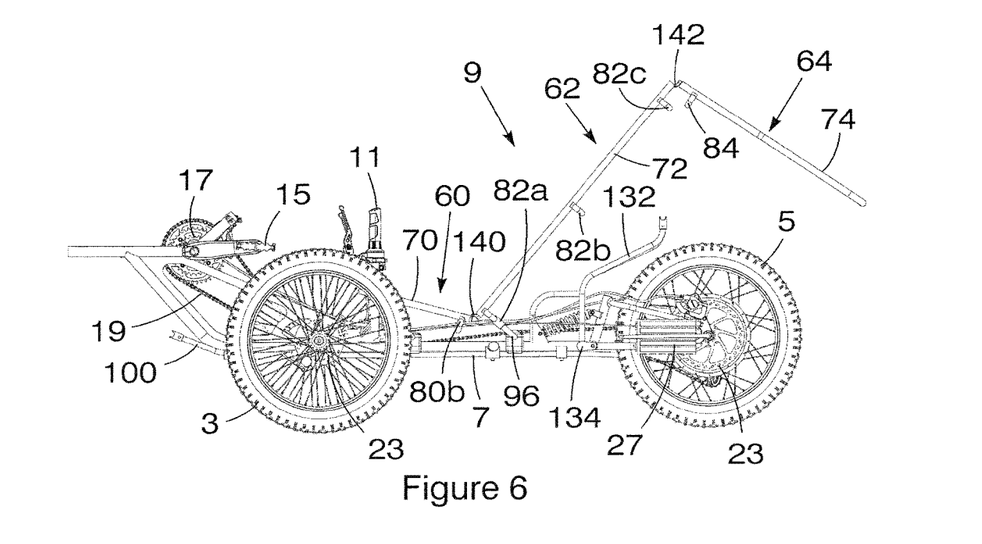
FIG. 6 is a side elevation of the frame of the recumbent cycle in FIG. 1.
Figure 7:
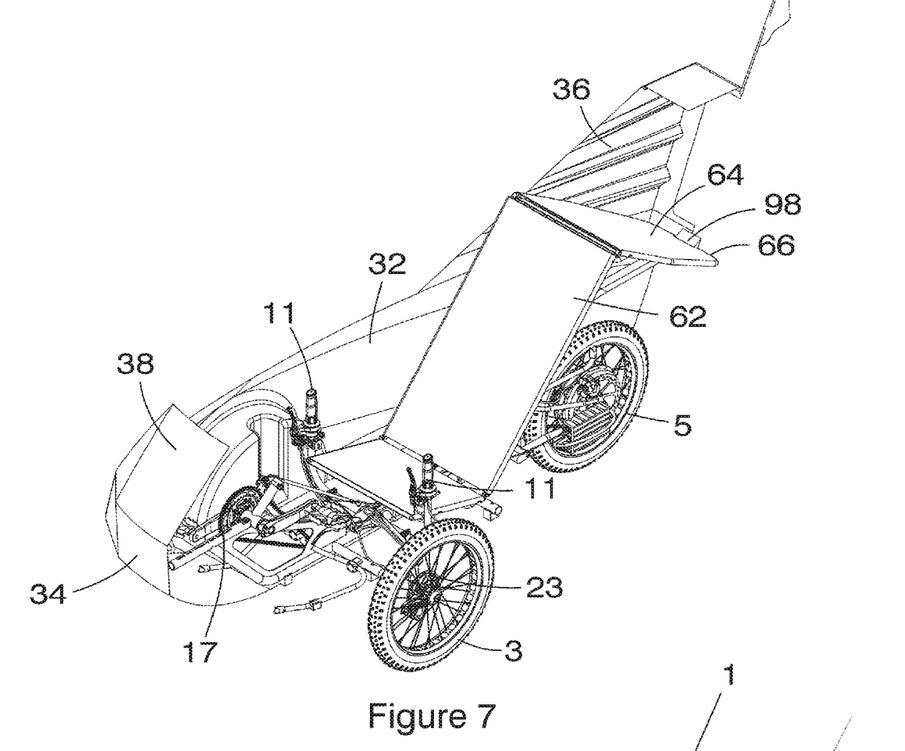
FIG. 7 is a part-sectional three-dimensional view of the recumbent cycle in FIG. 1 with the seat in the cycling condition.
Figure 8:
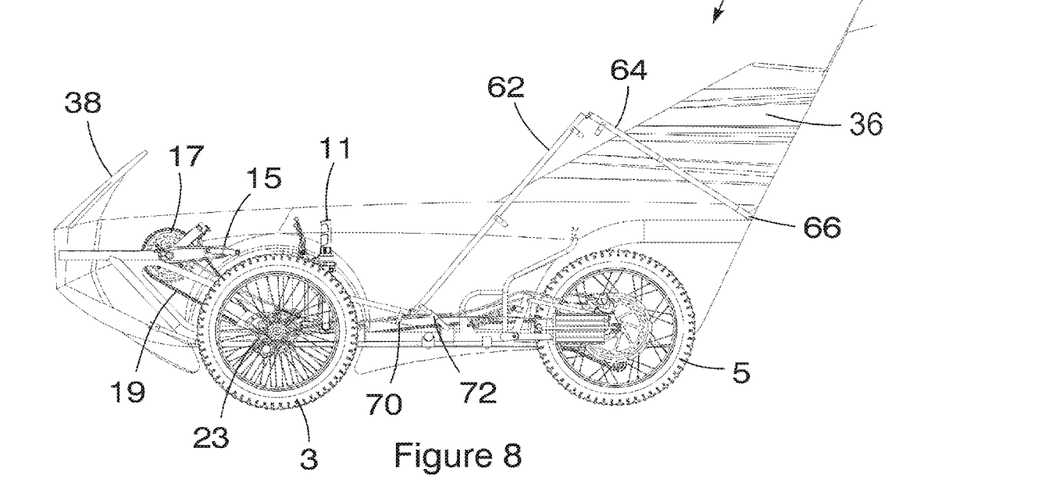
FIG. 8 is a part-sectional side elevation of the recumbent cycle in FIG. 1 with the seat in the cycling condition.

An embodiment of a recumbent cycle 1 is shown in FIGS. 1 to 21 and has a tricycle tadpole configuration with a pair of front wheels 3 and a single rear wheel 5 supported on a frame 7 (shown more clearly in FIG. 6). A seat 9 is provided on the frame 7 between the front wheels 3 and rear wheel 5 with a pair of hand levers 11 on either side thereof for steering the front wheels 3. Foot-operated pedals 15 carried on a crankset 17 are provided on the frame 7 forward of the front wheels 3 and elevated to about the top of the front wheels 3. A chain 19 driven by the crankset 17 runs in part under the frame 7 and drives a cassette 21 on the rear wheel 5. Brakes 23 are provided on the rear wheel 5 and front wheels 3 and operated by handles 25 on the levers 11. While not clearly visible in the figures, it should be noted that the chain 19 may run substantially within a body of the cycle 1 and at least partially within a protective tubing. The chain 19 may be routed around a forward set of pulleys and a rear pulley. The rear pulley may be collocated with the seat support so as to ensure adjustment of the seat position does not result in an interference of the chain 19 and the seat 9.

In this embodiment the hub on the rear wheel 5 is electrically assisted through a power pack 27 as is shown in FIG. 6.

Figure 1:
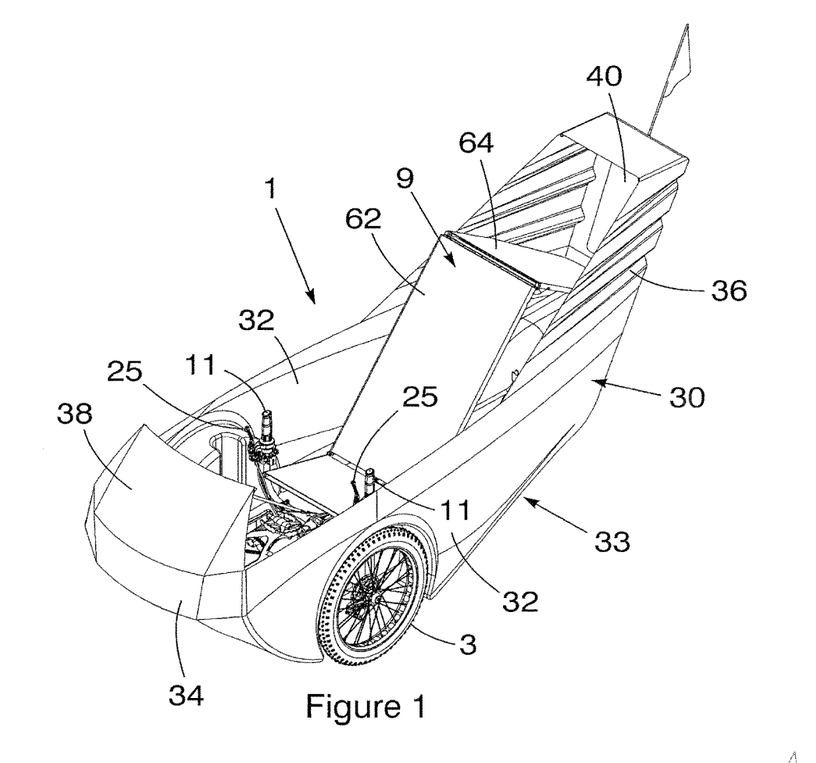
FIG. 1 is a three-dimensional view of a recumbent cycle.
Figure 2:
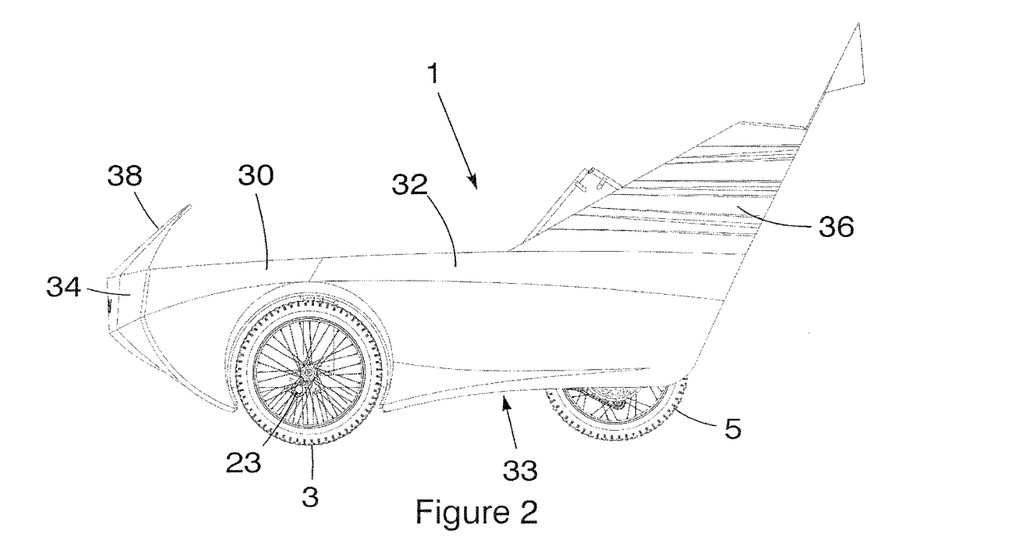
FIG. 2 is a side elevation of the recumbent cycle in FIG. 1.
Figure 3:
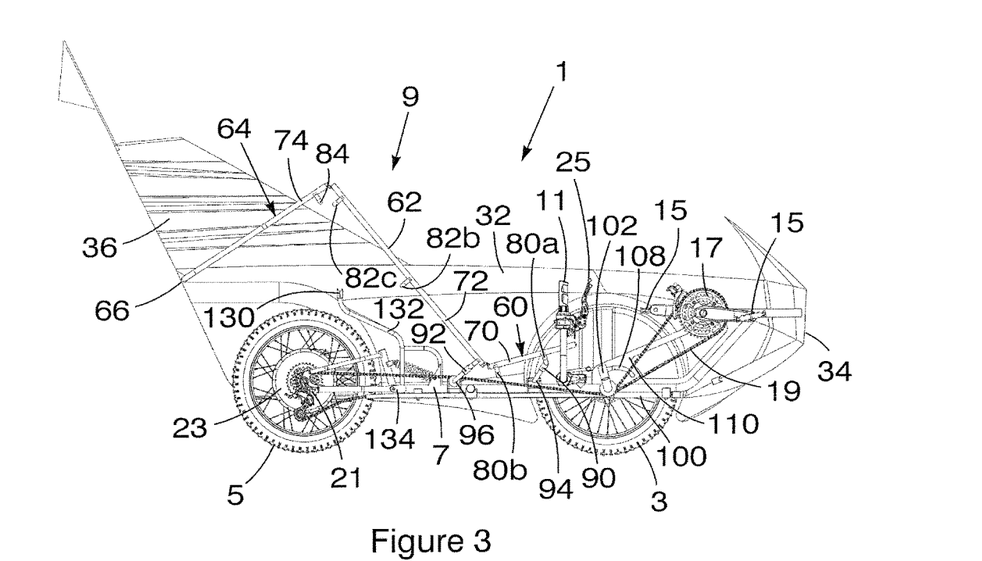
FIG. 3 is a part-sectional side elevation of the recumbent cycle in FIG. 1.
Figure 4:
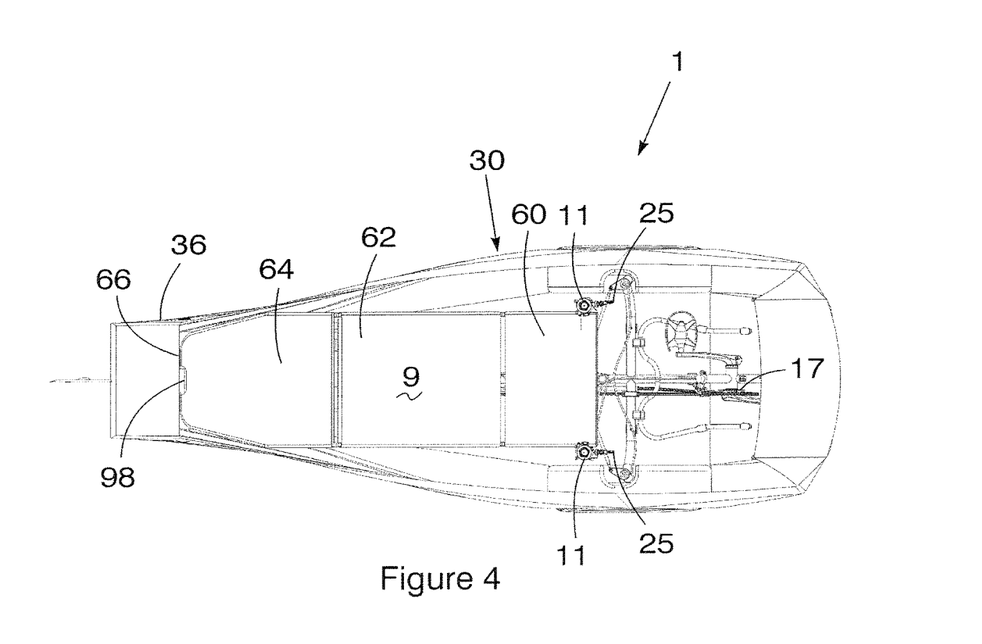
FIG. 4 is a top plane view of the recumbent cycle in FIG. 1.
Figure 5:
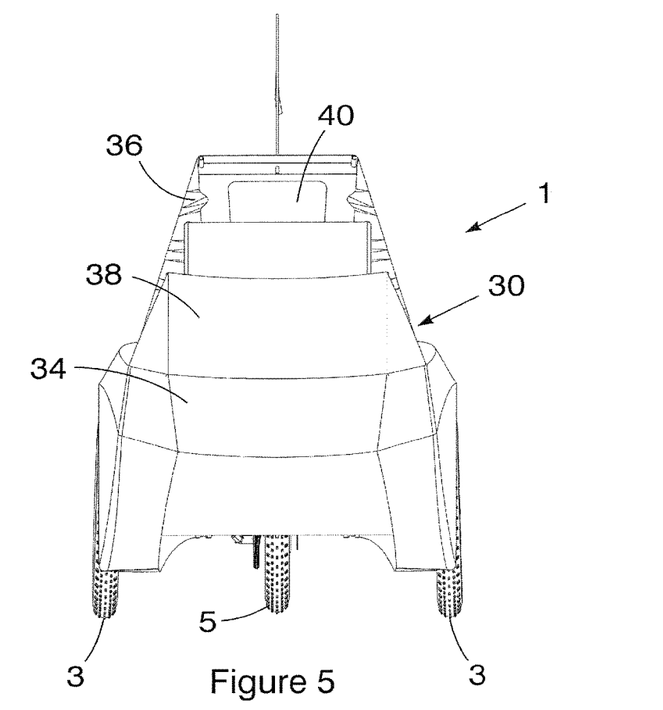
FIG. 5 is a front elevation of the recumbent cycle in FIG. 1.

An open-topped body 30 is secured to the frame 7 and has a somewhat teardrop, or tadpole, shape in plan view, as shown more clearly in FIG. 4. It is shell-like with side panels 32 and a bottom 33 extending from a nose cone 34 rearward to a tail 36. A windshield 38 extends from the nose cone 34 and an opening 40 is provided at the rear of the tail 36. In this embodiment the body 30 has a composite construction and is molded from fiberglass. In one embodiment the windshield 38 and the central panel comprising the nose cone 34 and downwardly positioned parts of the body 30 may be manufactured from a transparent material to improve visualization of the road to the driver. The transparent panel may also be the opening 40 fitted with a flexible cover with layers much the same as the canopy.

Figure 9:
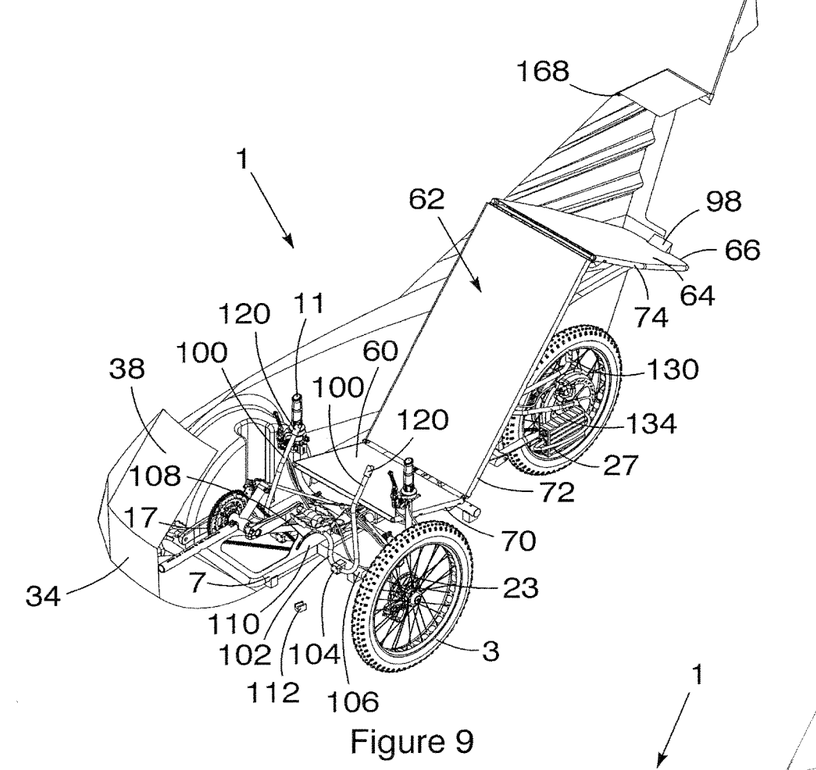
FIG. 9 is a part-sectional three-dimensional view of the recumbent cycle in FIG. 1 with the seat supports moved to a reclined condition.
Figure 10:
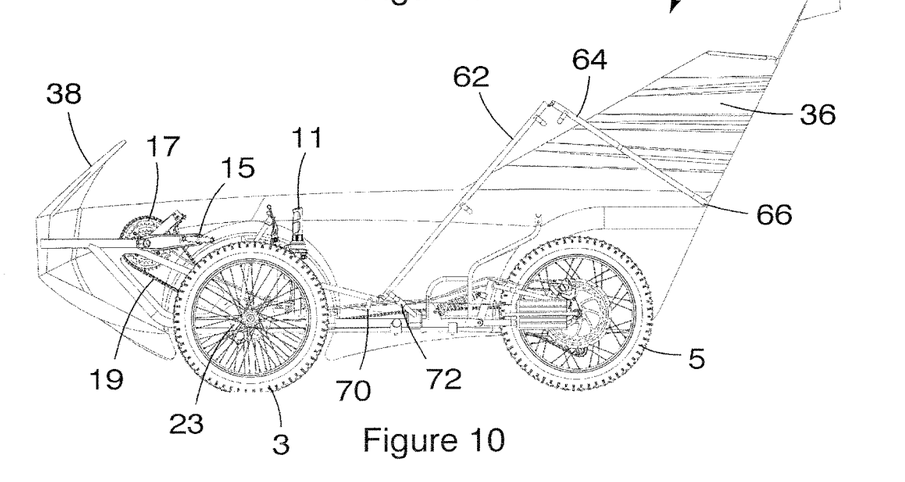
FIG. 10 is a part-sectional side elevation of the recumbent cycle in FIG. 1 with the seat supports moved to a reclined condition.
Figures 11, 12:
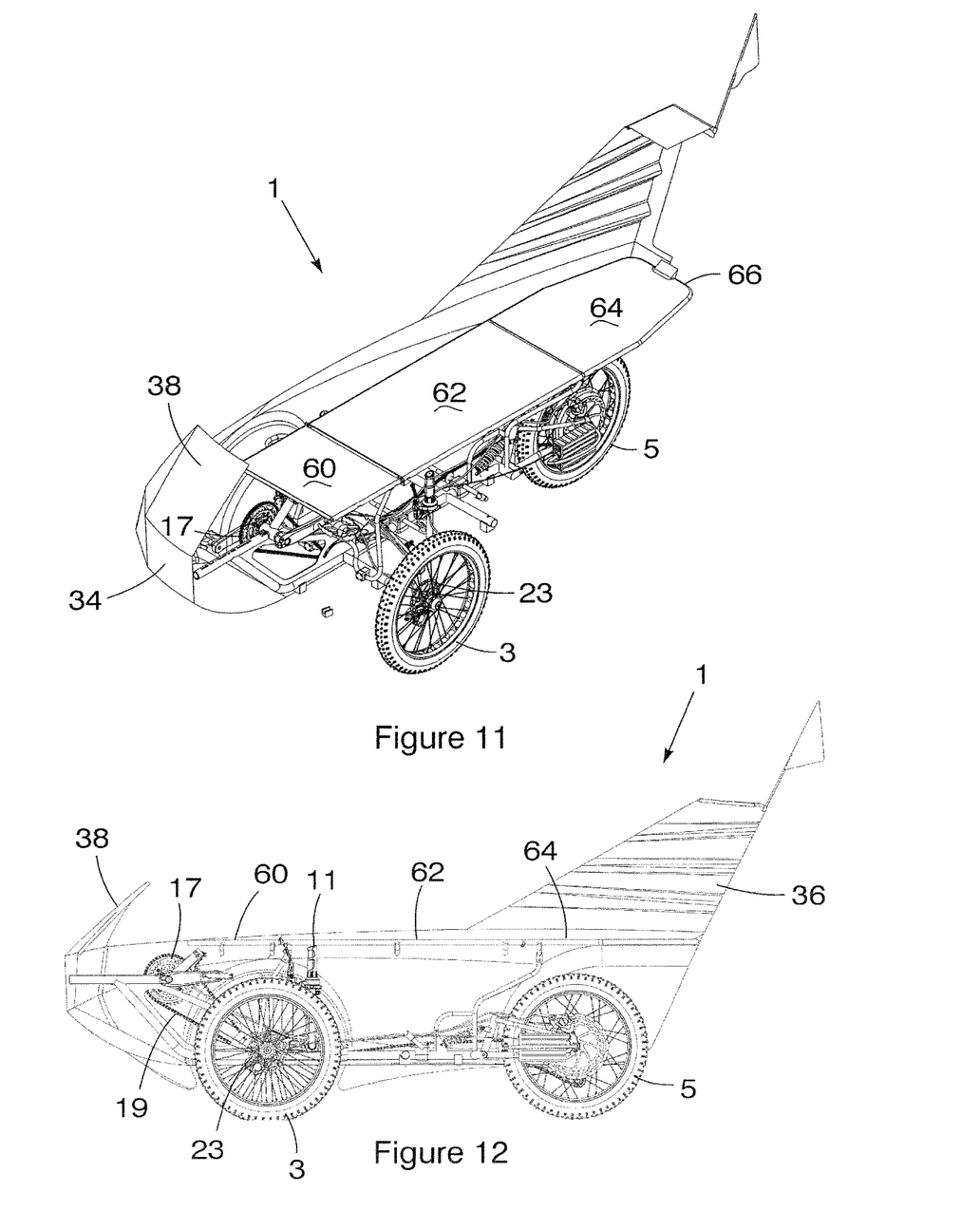
FIG. 11 is a part-sectional three-dimensional view of the recumbent cycle in FIG. 1 with the seat in the reclined condition.
FIG. 12 is a part-sectional side elevation of the recumbent cycle in FIG. 1 with the seat in the reclined condition.

Also in this embodiment, the seat 9 has three sections, a seat bottom 60, a seat back 62 and a head extension 64. The sections (60, 62, 64) are hinged and secured together so as to be movable between a cycling condition, as shown in FIGS. 1 to 10, and a reclined condition, as shown in FIGS. 11 and 12. Each section (60, 62, 64) is provided by a mesh material stretched tightly over a frame (70, 72, 74 respectively) with braces (80*a*, 80*b*, 82*a*, 82*b*, 82*c*, and 84, respectively) extending across each frame below the mesh and spaced apart from each other.

In the cycling condition the seat 9 has a chair-like configuration with the seat bottom 60 inclined relative to the seat back 62, and the head extension 64 inclined relative to the seat back 62 in a Z-like shape with the seat bottom 60 directed generally towards the crankset 17. The braces (80*a*, 82*a*) on the seat bottom 60 and seat back 62 are each received in a pair of C-shaped supports (90, 92), which are, in turn, secured to the frame 7 via the tubes (94, 96) and of mounting blocks. While adjustable, in the embodiment shown the support 90 for the seat bottom 60 is adjacent the trailing edge of the front wheels 3 while the support 92 for the seat back 62 is generally central of the front wheels 3 and rear wheel 5. The incline of the seat bottom 60 relative to the seat back 62 may be adjustable and the exact dimensions of the frame may be modified to allow for a large range of angles.

A free end 66 of the head extension 64 is hinged and secured in a clip 98 extending internally of the body 30 at its tail 36 and which provides a snap fit over the central part of the frame 74.

The seat bottom 60 and seat back 62 are both rectangular in shape while the head extension 64 has parallel sides from its junction with the seat back 62 and then tapers somewhat towards its free end 66 to follow the taper in the body 30.

Notably, as shown in FIGS. 11 and 12, the seat 9 can be moved to the reclined condition. This is achieved by first folding a pair of arms 100 into an upright, supporting position, as shown in FIGS. 9 and 10. The arms 100 are joined by a connecting rod 102 which is secured by a bush 104 to the front axle 106 on each side of the frame 7. The central part of the connecting rod 102 is inwardly bent in the direction of the arms 100 to permit it to extend over the frame 7 and runs in an arcuate slot 108 in each of a pair of cheek plates 110 on the frame 7. With the seat 9 in the cycling condition the arms 100 are in a resting position directed towards the nose cone 34 in line with the frame 7 and supported by rubber rests 112 secured to the frame 7 substantially centrally along their length. The ends of the slots 108 define stop positions for the connecting rod 102 and hence the arms 100, the stop positions being the resting position and the supporting position. A retaining arrangement (not shown) may be provided to hold the connecting rod 102 and hence the arms 100 in position.

The free end of each arm 100 is bent to be inclined rearwards with the arms upright in the supporting position (or upwardly with the arms in the resting position) and a C-shaped support 120 is carried on the end of each arm 100.

With the arms 100 in the upright, supporting position, the seat bottom 60 is lifted upwardly off the supports 90 and in the direction of the arms 100. This causes the seat back 62 to be lifted off the supports 92. The seat bottom 60 is then lifted over the arms 100 and pulled in the direction of the nose cone 34 until the brace 82*a* on the seat back 62 can be located in the supports 120 on the arms 100. In this condition the brace 84 on the head extension 64 locates in a pair of C-shaped supports 130 each carried on a cranked arm 132 secured on opposite sides of the frame 7. A hinge point 134 is provided near the rear wheel 5 about which the rear suspension rotates. The supports 130 are held by the arms 132 the same height above the frame 7 as the supports 120 with the arms 100 in the upright position. The result is that the seat 9 assumes a horizontal, stretcher-like configuration, with the sections (60, 62, 64) substantially co-planar with each other, and so forms a bed.

The hinges 140 between the seat bottom 60 and seat back 62 and the hinges 142 between the seat back 62 and the head extension 64 assist in maintaining the seat 9 in the reclined condition as they only permit relative rotation through 180°. This is achieved by positioning the axis of rotation to one side of the frames (70, 72, 74) of the sections (60, 62, 64) such that the frames (70, 72, 74) abut each other in the reclined condition. Thus the hinge 140 does not permit movement of the seat bottom 60 from the horizontal condition further downward towards the frame 7 through having the axis of rotation on the top side of the frames (70, 72). It only permits the seat bottom 60 to be lifted up and folded onto the top of the seat back 64. Similarly, the hinge 142 has an axis of rotation on the bottom side of the frames (72, 74) and only permits upward movement of the seat back 62 and the head extension 64 at their junction. Without the need for special locking mechanisms and supported at only two points along its length, weight can thus be placed on the bed, which is formed in the reclined condition without causing the sections (60, 62, 64) to hinge toward the frame and collapse.

Figure 13:
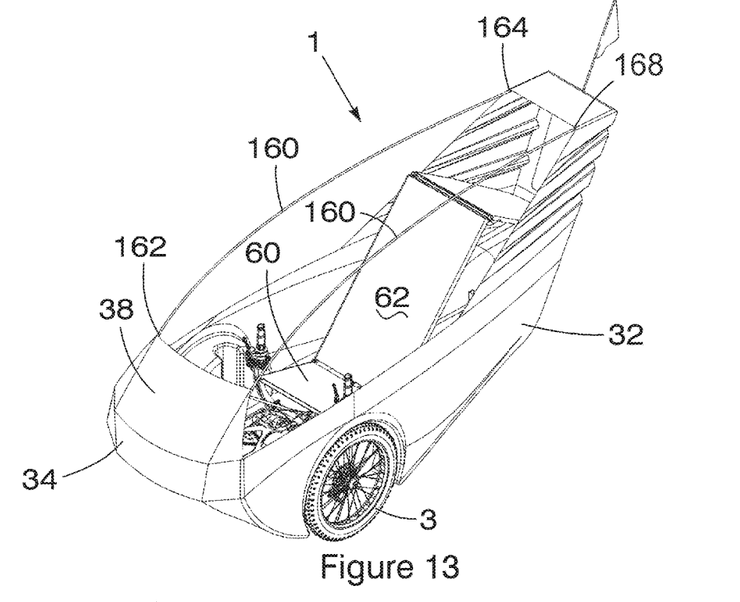
FIG. 13 is a three-dimensional view of the recumbent cycle in FIG. 1 with the canopy struts erected.
Figures 14, 15:
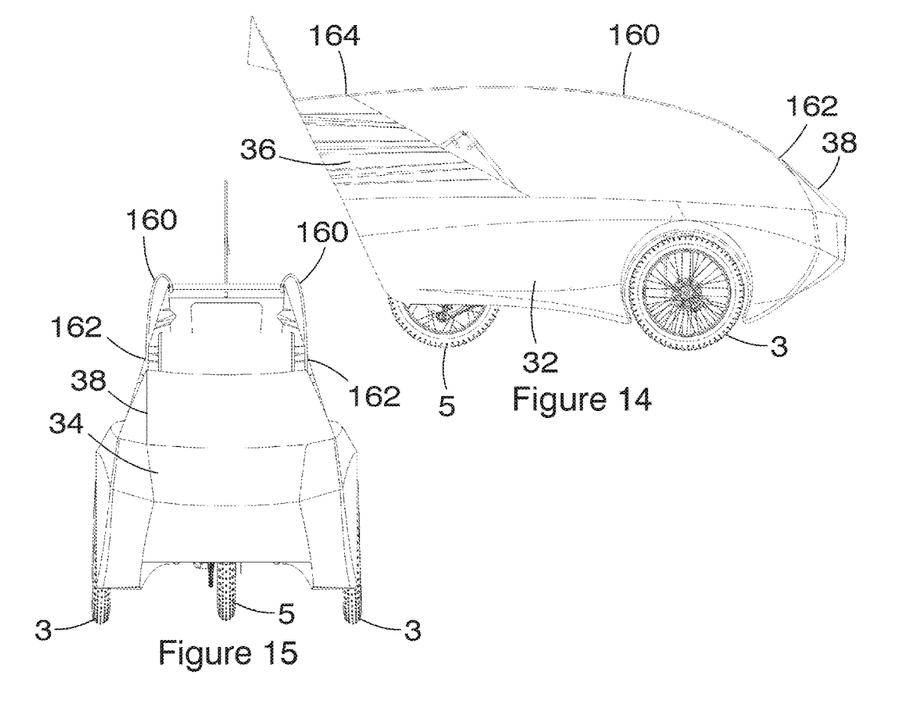
FIG. 14 is a side elevation of the recumbent cycle in FIG. 13.
FIG. 15 is a front elevation of the recumbent cycle in FIG. 13.

The recumbent cycle 1 also has provision for erecting a shelter over the body. This may be achieved by first securing a pair of resiliently flexible struts 160 on opposite sides of the body 30 between the top of the windshield 38 and the top of the tail 36, as shown in FIGS. 13 to 15. The ends (162, 164) of the struts 160 are received in complementary sockets in the windshield 38 and tail 36 respectively which hold the struts 160 in a bowed shape. The socket in the windshield 38 not being visible, but the socket 168 in tail 36 is shown (see FIG. 9). Being flexed in this manner, the struts 160 are resistant to lateral deformation.

In this embodiment the struts 160 have a construction similar to that of multi-segmented tent poles and need not be described in detail except to say that each segment has a ferrule on one end and some include mating ferrules on each end. Elastic shock-cord is fastened at one end of the first segment and then threaded through each of the remaining segments of the pole. The cord is then terminated at the opposite end of the final segment. The ferrules are arranged so that when the shock-corded segments are released, each segment will be mated into the ferrule of the adjacent segment, resulting in a fully connected strut. This construction aids in compact storage of the struts 160 when not in use.

Figure 16:
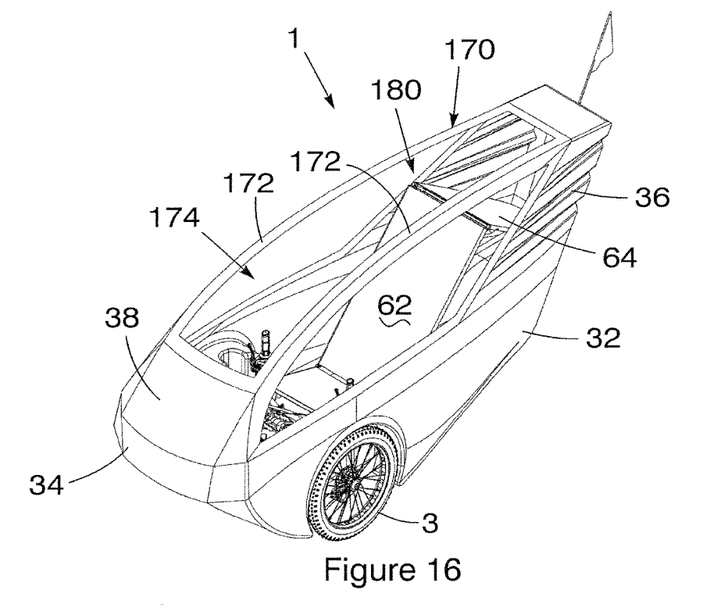
FIG. 16 is a three-dimensional view of the recumbent cycle in FIG. 1 with an open canopy erected.
Figures 17, 18:
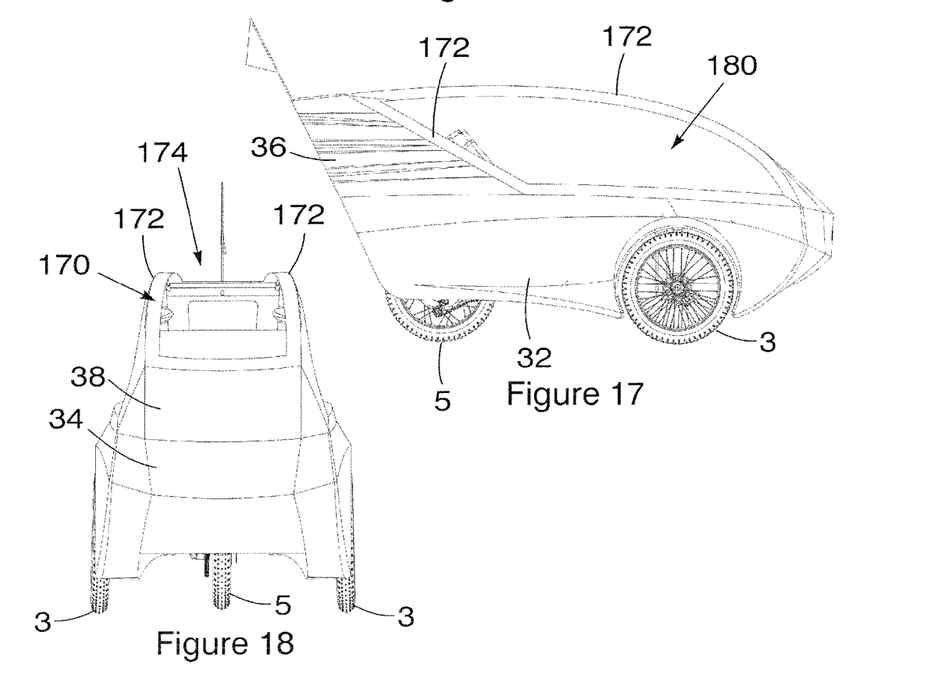
FIG. 17 is a side elevation of the recumbent cycle in FIG. 16.
FIG. 18 is a front elevation of the recumbent cycle in FIG. 16.

Referring to FIGS. 16 to 18, a shelter is provided by a collapsible canopy 170 that is secured to the struts 160 to form an enclosed space with the body 30. The canopy 170 has strips of an opaque nylon material forming a frame-like surround 172 which covers the struts 160 and runs along the free end of the body 30. Fasteners (not shown) may be used to secure the canopy 170 to the struts 160 and to the body 30. In this embodiment strips of material which can be fastened around the struts 160 to form loops are provided internally of the canopy 170. These can conveniently be fastened together using VELCRO® strips at their ends. Hooks are provided at the periphery of the canopy 170 for securing it to the body 30. Complementary eyelets are provided on the body 30 for receiving the hooks. In an alternative arrangement the canopy may be fitted with an elastic chord that runs the periphery of the canopy. The cord may be stretched and secured over a series of hooks spaced apart on the body to hold the canopy in place.

Figure 19:
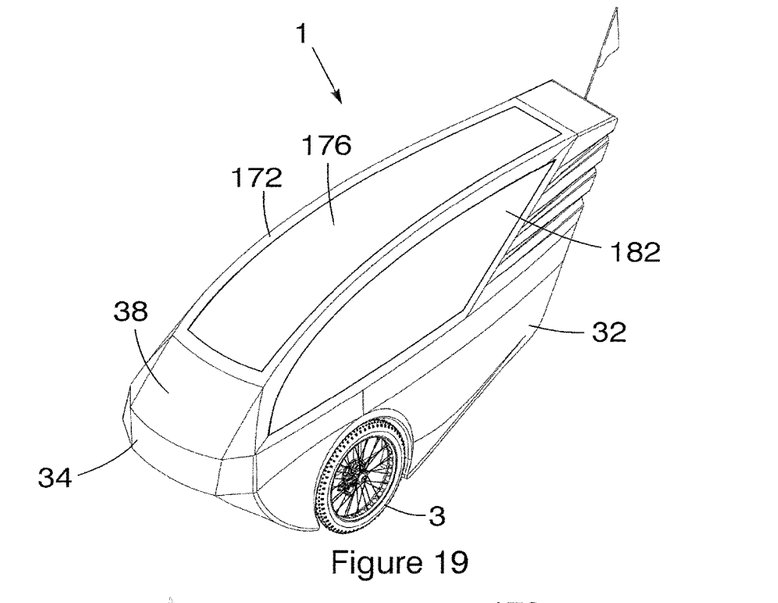
FIG. 19 is a three-dimensional view of the recumbent cycle in FIG. 1 with a closed canopy.
Figures 20, 21:
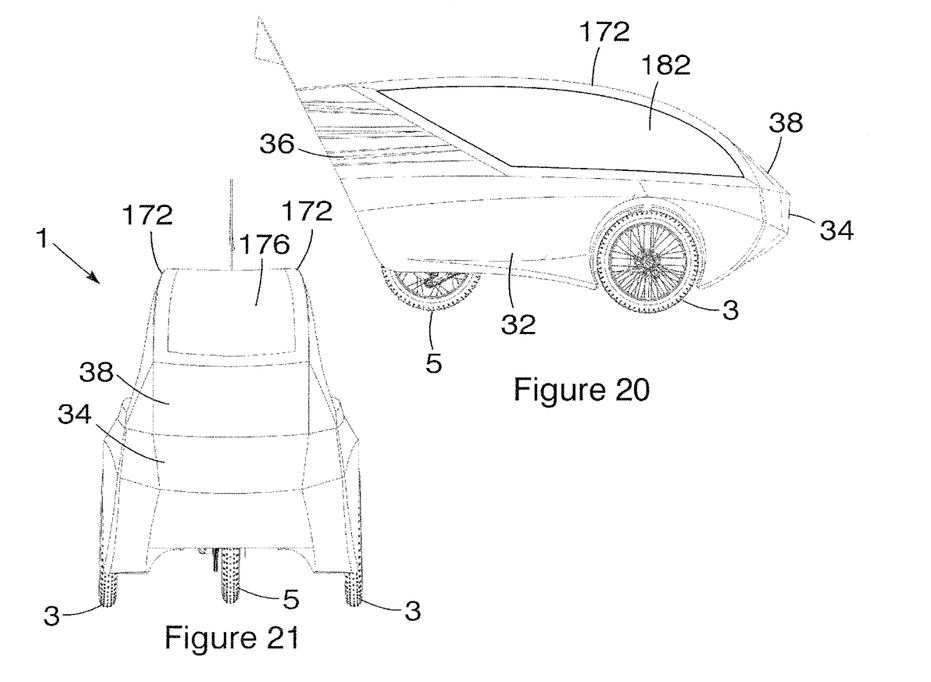
FIG. 20 is a side elevation of the recumbent cycle in FIG. 19.
FIG. 21 is a front elevation of the recumbent cycle in FIG. 19.

A panel 174 of a transparent plastics material is provided on the canopy 170 between struts 160 above the seat 9 and an at least partially removable privacy cover 176 can be secured beneath the transparent panel 174, as shown in FIGS. 19 to 21. An opaque material is used for the privacy cover and it can be secured to the surround 172 of the canopy 170 using a zip fastener that extends around its periphery. The privacy cover extends, in this embodiment, internally of the windshield 38.

Openings 180 defined by the surround 172 extend through either side of the canopy 170 between the struts 160 and the body 30. These openings provide access to the enclosed space and can be seen as access openings or windows. Each opening 180 has three complementary covers 182 (only one shown) which may be secured over it. The covers are made from panels of flexible material and include a transparent cover made of a plastics material, an insect mesh cover and a privacy cover 182 made of an opaque material. Zip fasteners about the periphery of each cover 182 permit them to be secured to the surround 172. Individual zip fasteners are provided for each cover 182 on the surround so that each cover can be used independently of the others. Thus, any one or more cover 182 can be used at any time. This permits entrance and exit from the enclosure as well as the desired level of weather proofing and privacy.

Apart from the wheels (3, 5) the entire cycle is enclosed when the shelter is erected. The construction and operation of the canopy and struts is similar to that used for conventional tents and will be apparent to those skilled in the art.

Eyelets for guy-ropes (not shown) may be provided on the surround 172 of the canopy 170 to allow the cycle to be securely tied down in severe weather. The canopy may be stored in a folded or crumpled condition when collapsed and a receptacle (not shown) is provided internally of the body 30 in which to store it, the struts and guy-ropes.

It is foreseen that a hand-operated break mechanism may be provided, which may be activated to hold the cycle when used as a shelter.

The recumbent cycle is able to be transformed into a tented structure with a bed inside that is suitable for sleeping in. This provides it with great versatility and permits it to be used for extended trips without the need for carrying a separate tent and stretcher or the like.

It will be appreciated that many other embodiments of a recumbent cycle exist, which fall within the scope of the invention, particularly regarding the wheel configuration and operation, the provision of a body, the seat configuration and the shelter. It will also be appreciated that various changes, modifications and/or additions may be made to the embodiments described without departing from the scope of the invention. By way of non-limiting examples it is for example foreseen that: the cycle may be configured to make the forward as well as backward locations of the pedals adjustable so as to accommodate riders of different heights; the handle positions on the cycle may be adjustable; the securing of the body 30 to the frame 7 may be achieved in a number of alternative ways; and that a variety of different gear actuator configurations and derailleurs on the crank sets may be utilized on the cycle.

It should also be noted that the location of the steering mechanism within the cycle body enables a single hole to be provided through the body for the wheel hub. This reduces the amount of, or even prevents, road dirt entering the body. Similarly a slot in the rear of the body provided for the swing arm and chain may be fitted with brushes or a rubber boot to prevent dirt from entering the body. Naturally the cycle of this invention may be fitted with any number of features and items otherwise provided for use with typical bicycles.

Finally, it should be noted that the cycle of this invention may be configured to enable the cyclist to lie in the supine position with his or her head towards the front of the cycle and feet towards the rear or, alternatively, with his or her feet towards the front of the cycle and head towards the rear. It is however foreseen that, due to the body of the cycle conceivable tapering towards the front, it may be preferred for the cyclist to lie with his or her head towards the front of the cycle.

Throughout the specification unless the contents requires otherwise, the word "comprise," or variations such as "comprises" or "comprising," will be understood to imply the inclusion of a stated integer or group of integers but not the exclusion of any other integer or group of integers.

What is claimed is:

1. A recumbent cycle, comprising:
 a recumbent cycle frame;
 pedals operably coupled to the recumbent cycle frame; and
 a seat supported by the recumbent cycle frame, at least a portion of the seat being positioned at or below an axis of rotation of the pedals, the seat being movable between a cycling condition and a reclined condition, the seat forming a bed in the reclined condition.

2. The recumbent cycle of claim 1, wherein the recumbent cycle is a tricycle.

3. The recumbent cycle of claim 1, further comprising a collapsible shelter erected over at least the seat.

4. The recumbent cycle of claim 3, wherein the collapsible shelter at least partially encloses the recumbent cycle.

5. The recumbent cycle of claim 3, wherein the collapsible shelter includes struts releasably securable to the recumbent cycle and a canopy securable over the struts.

6. The recumbent cycle of claim 5, wherein the canopy is made of flexible sheet material.

7. The recumbent cycle of claim 5, wherein the canopy has openings with a number of different covers that are securable over each opening.

8. The recumbent cycle of claim 1, wherein the seat has a seat back and a seat bottom, the seat back is inclined relative to the seat bottom in the cycling condition, and the seat back and the seat bottom extend in generally the same plane in the reclined condition.

9. A recumbent cycle, comprising:
 a recumbent cycle frame:
 pedals operably coupled to the recumbent cycle frame;
 a seat supported by the recumbent cycle frame, at least a portion of the seat being positioned at or below an axis of rotation of the pedals, the seat being adjustable between a cycling condition and a reclined condition in which the seat forms a bed; and
 a collapsible shelter securable to the recumbent cycle over at least the seat.

10. The recumbent cycle of claim 9, wherein the collapsible shelter at least partially encloses the recumbent cycle.

11. The recumbent cycle of claim 9, wherein the collapsible shelter includes struts and a canopy, the struts being releasably securable to the recumbent cycle, the canopy being securable over the struts.

12. The recumbent cycle of claim 11, wherein the canopy has openings with a number of different covers, the covers being securable over each opening.

13. The recumbent cycle of claim 9, wherein the recumbent cycle is configured to support a stretcher in a substantially horizontal orientation.

14. A recumbent cycle, comprising:
a recumbent cycle frame;
pedals operably coupled to the recumbent cycle frame;
a seat supported by the recumbent cycle frame, wherein an axis of rotation of the pedals is located forward of and elevated above at least a portion of the seat such that a user operates the pedals from a recumbent position, the recumbent cycle being configured to selectively support a stretcher in a substantially horizontal orientation.

15. The recumbent cycle of claim 8, wherein the seat bottom is below a horizontal plane of a top of a rear wheel when the recumbent cycle is in the cycling condition, and the seat bottom is above a horizontal plane of the top of the rear wheel when the recumbent cycle is in the reclined condition.

16. The recumbent cycle of claim 9, wherein the seat further comprises a seat bottom, a seat back, and a head extension, the seat back being secured between the seat bottom and the head extension with hinges.

17. The recumbent cycle of claim 16, wherein:
each of the seat bottom and the head extension is inclined relative to the seat back when the recumbent cycle is in the cycling condition; and
the seat back, the seat bottom, and the head extension are generally coplanar with respect to one another when the recumbent cycle is in the reclined condition.

18. The recumbent cycle of claim 14, wherein the recumbent cycle supports the stretcher in the substantially horizontal orientation when the recumbent cycle is in a reclined condition, the stretcher being collapsible and stowable on the recumbent cycle when the recumbent cycle is in a cycling condition.

19. The recumbent cycle of claim 18, wherein the seat further comprises a seat bottom, a seat back, and a head extension positioned in a nonplanar configuration when the recumbent cycle is in the cycling condition, the stretcher in the substantially horizontal orientation being located above the seat positioned in a generally coplanar configuration when the recumbent cycle is in the reclined condition.

20. The recumbent cycle of claim 19, wherein the seat bottom and the head extension are secured to the seat back with hinges to enable movement between the cycling condition and the reclined condition.

* * * * *